(12) United States Patent
Fishman et al.

(10) Patent No.: US 7,719,579 B2
(45) Date of Patent: May 18, 2010

(54) DIGITAL CAMERA ARCHITECTURE WITH IMPROVED PERFORMANCE

(75) Inventors: Alex Fishman, San Jose, CA (US); Shimon Pertsel, Sunnyvale, CA (US); Victor Pinto, Zychron-Yaakov (IL); Michael Shalev, Zichron Yaacov (IL)

(73) Assignee: Zoran Corporation, Sunnyvale, CA (US)

( * ) Notice: Subject to any disclaimer, the term of this patent is extended or adjusted under 35 U.S.C. 154(b) by 1365 days.

(21) Appl. No.: 11/137,303

(22) Filed: May 24, 2005

(65) Prior Publication Data

US 2006/0268124 A1 Nov. 30, 2006

(51) Int. Cl.
*H04N 5/76* (2006.01)
*H04N 5/228* (2006.01)

(52) U.S. Cl. ............... 348/231.99; 348/222.1; 382/239

(58) Field of Classification Search ......... 348/312, 348/322; 710/52–53
See application file for complete search history.

(56) References Cited

U.S. PATENT DOCUMENTS

| | | | |
|---|---|---|---|
| 6,269,183 B1 * | 7/2001 | Matoba et al. ............ 382/166 |
| 6,791,609 B2 | 9/2004 | Yamauchi et al. ........ 348/273 |
| 6,829,016 B2 | 12/2004 | Hung ...................... 348/581 |
| 6,836,289 B2 | 12/2004 | Koshiba et al. .......... 348/273 |
| 6,873,658 B2 | 3/2005 | Zhou .................... 375/240.25 |
| 2002/0051643 A1 | 5/2002 | Nakashita ................ 396/429 |
| 2002/0054229 A1 | 5/2002 | Saski ...................... 348/312 |
| 2002/0135683 A1 | 9/2002 | Tamama et al. ........... 348/222 |
| 2003/0169346 A1 * | 9/2003 | Ojima et al. ........... 348/207.99 |
| 2003/0222998 A1 | 12/2003 | Yamauchi et al. ........ 348/262 |
| 2003/0227545 A1 * | 12/2003 | Soya et al. ................ 348/143 |
| 2004/0046880 A1 | 3/2004 | Kawakubo ................ 348/272 |
| 2004/0201714 A1 | 10/2004 | Chung .................... 348/220.1 |

FOREIGN PATENT DOCUMENTS

| | | |
|---|---|---|
| DE | 10044746 C1 | 1/2002 |
| DE | 10127186 A1 | 12/2002 |
| EP | 0989753 A1 | 3/2000 |
| EP | 1265433 A1 | 12/2002 |

OTHER PUBLICATIONS

International Search Report and Written Opinion for International Application No. PCT/US2006/010966, mailed Sep. 9, 2006.

* cited by examiner

*Primary Examiner*—John M Villecco
*Assistant Examiner*—Hung H Lam
(74) *Attorney, Agent, or Firm*—Morgan, Lewis & Bockius LLP

(57) ABSTRACT

A digital camera acquires a first image in a sequence of images by loading it into a unified memory space of the digital camera in a first order and processing it in a second order. Before the first image is completely processed, the digital camera starts acquiring a second image and overwriting at least a processed portion of the first image in the unified memory space with image data of the second image.

28 Claims, 14 Drawing Sheets

DIGITAL CAMERA ARCHITECTURE WITH IMPROVED PERFORMANCE

FIELD OF THE INVENTION

The present invention relates generally to digital cameras, and in particular, to digital camera architecture with improved performance.

BACKGROUND OF THE INVENTION

Digital cameras are popular consumer electronic appliances. Unlike traditional cameras, digital cameras capture images using an electronic device called an "image sensor." The image captured by the image sensor is then digitized and loaded into a memory device. The digital camera applies various image processing techniques to the digital image in the memory device, e.g., noise suppression, color compensation, etc. Finally, the processed image is compressed into a file having a specific format and stored in a non-volatile storage device for subsequent use by other electronic appliances, such as a personal computer (PC), personal digital assistant (PDA), or printer.

A parameter used for evaluating the performance of a digital camera is the click-to-click time, which measures the minimum amount of time that must elapse between two consecutive presses of the shutter button of the digital camera. The shorter the click-to-click time, the more pictures the digital camera can take within a fixed period. Digital cameras with short click-to-click times can take a sequence of pictures in quick succession, mimicking the operation of high-end motorized film cameras. Factors affecting the click-to-click time of a digital camera include the size of its memory and the speeds of the various image data processing procedures performed on the images captured by the camera's image sensor. One goal of the present invention is to provide a digital camera having a reduced click-to-click time and therefore improved performance.

SUMMARY

A digital camera is provided that acquires a first image in a sequence of images by loading portions of the first image into a unified memory space of the digital camera in a first order and processing these portions in a second order. Before the first image is completely processed, the digital camera starts acquiring a second image and overwriting at least a processed portion of the first image in the unified memory space with image data of the second image.

In some embodiments, a digital camera acquires a first image and a second image with an image sensor. The image data of the first and second images are stored in a unified memory space within the digital camera. In particular, the digital camera stores the image data of the second image in the unified memory space before it completes processing of the first image. Therefore, the image data of the second image at least partially overwrites the image data of the first image in the unified memory space.

In some embodiments, a digital camera acquires a first image with the image sensor, reads image data of the first image from the image sensor to memory within the digital camera, and converts the image data of the first image to a digital camera output format. While working on the first image, the digital camera simultaneously starts acquiring a second image with the image sensor. As a result, the click-to-click time is less than the sum of a readout time interval to read out the image data of an image from the image sensor and a conversion time interval to convert the image data of the image to the digital camera output format. At any moment during the operation of the digital camera, the maximum amount of image data that is stored in the memory is less than a total amount of image data associated with the first and second images.

BRIEF DESCRIPTION OF THE DRAWINGS

Like reference numerals refer to corresponding parts throughout the several views of the drawings.

DESCRIPTION OF EMBODIMENTS

Figure 1A:
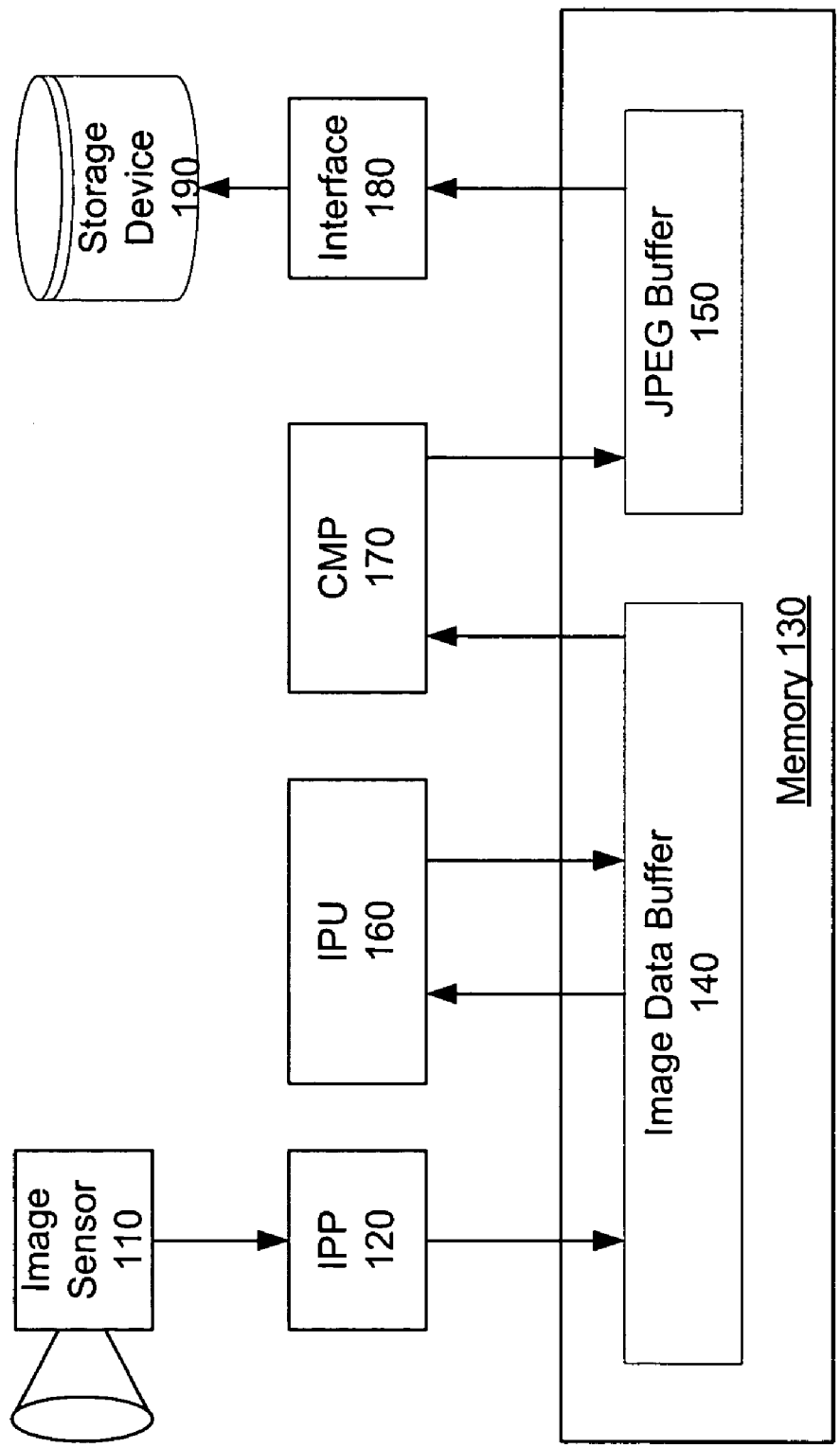
FIG. 1A is a data flow diagram illustrating the operation of a prior art digital camera.

FIG. 1A is a data flow diagram illustrating the operation of a prior art digital camera. When a user presses the shutter button, light enters through the lens of the camera and reaches the image sensor 110. After completion of the exposure time, a raw image is formed in the image sensor 110. The raw image formed in the image sensor 110 is typically in the RGB color domain. A subsequent image processing procedure is required to convert the image from the RGB color domain to the YUV color domain. Image processing and compression operations are typically performed on YUV image data, requiring RGB image data from the image sensor to be converted to YUV image data.

An image pre-processing unit IPP 120 reads out the raw image data from the image sensor 110 and stores the data in an image data buffer 140. In some embodiments, memory 130 hosting the unified memory space (including image data buffer 140 and the JPEG buffer 150) is a single electronic device (e.g., a 32 MB DRAM). In some other embodiments, memory 130 includes multiple devices. In either case, memory 130 can be treated as a unified memory space. As explained in more detail below, the unified memory space is also used to implement other buffers within the digital camera, such as one more YUV buffers and JPEG buffers.

After the raw image data is completely stored in the image data buffer 140, an image processing unit IPU 160 begins to apply a series of processing procedures to convert the raw image data to a digital camera output format suitable for storage and display. The processing procedures are well known to engineers skilled in digital camera design. For illustrative purposes, the following discussion is limited to the procedure of converting the image data from the RGB color domain to the YUV color domain. However, one skilled in the art will understand that the present invention is independent of the specific image processing procedures implemented by the digital camera. The digital camera output format is the data format of a processed digital image stored in a non-volatile storage device associated with the digital camera. An exemplary digital camera output format is the JPEG image standard. However, other image formats including proprietary ones can also be used. The non-volatile storage device may take the form of Flash ROM, optical, magnetic, or any other type of digital storage media. The non-volatile storage device may be a removable memory device, such as a memory card or stick, or may be an integral part of the digital camera.

Ideally, a large image data buffer can enable better performance in a digital camera. However, there are practical limits on the size of the image data buffer 140. As an example, if an image generated by the image sensor has 8 M pixels and each pixel corresponds to two bytes, the size of the image data buffer will be at least 16 MB. After excluding memory space reserved for other purposes, the remaining free space in a 32 MB DRAM can host only one image. Although it is technically possible to solve this space constraint by using a memory device of larger capacity, e.g., 64 MB DRAM, the high cost of such a memory device nonetheless makes it economically unattractive. Accordingly, the processed image in the YUV color domain has to be stored in the image data buffer by overwriting the raw image in the RGB color domain. As will be apparent below in connection with FIG. 1B, this requirement sets a serious challenge to the reduction of the click-to-click time.

After processing an image, the digital camera typically employs an image compression unit CMP (sometimes called a compression processor) 170 to compress the processed image, to reduce its size on the non-volatile storage device 190, e.g., a flash memory card. There are many well-known image compression techniques in the relevant art. They can dramatically reduce the size of a digital image with little loss of image quality. The following discussion will use the JPEG scheme for illustrative purposes. However, it will be understood by one skilled in the art that the present invention is independent from any specific data compression technique.

To compress an image, CMP 170 retrieves the processed image from the image data buffer 140, converts it into a JPEG-format file, and stores the file in a JPEG buffer 150. Some digital cameras have a fixed image compression ratio (e.g., 4:1) and the size of the JPEG buffer is therefore a fixed value. But some other digital cameras allow the user to choose different compression ratios for different images. In this case, the size of the JPEG buffer is a dynamic value depending on the compression ratio chosen by the user.

Finally, the compressed image in the form of a JPEG-format file is stored in the storage device 190 through an interface 180. Later on, the digital camera may be connected to another device, such as a PC, and the JPEG-format files can then be transmitted from the digital camera to that device.

Figure 1B:
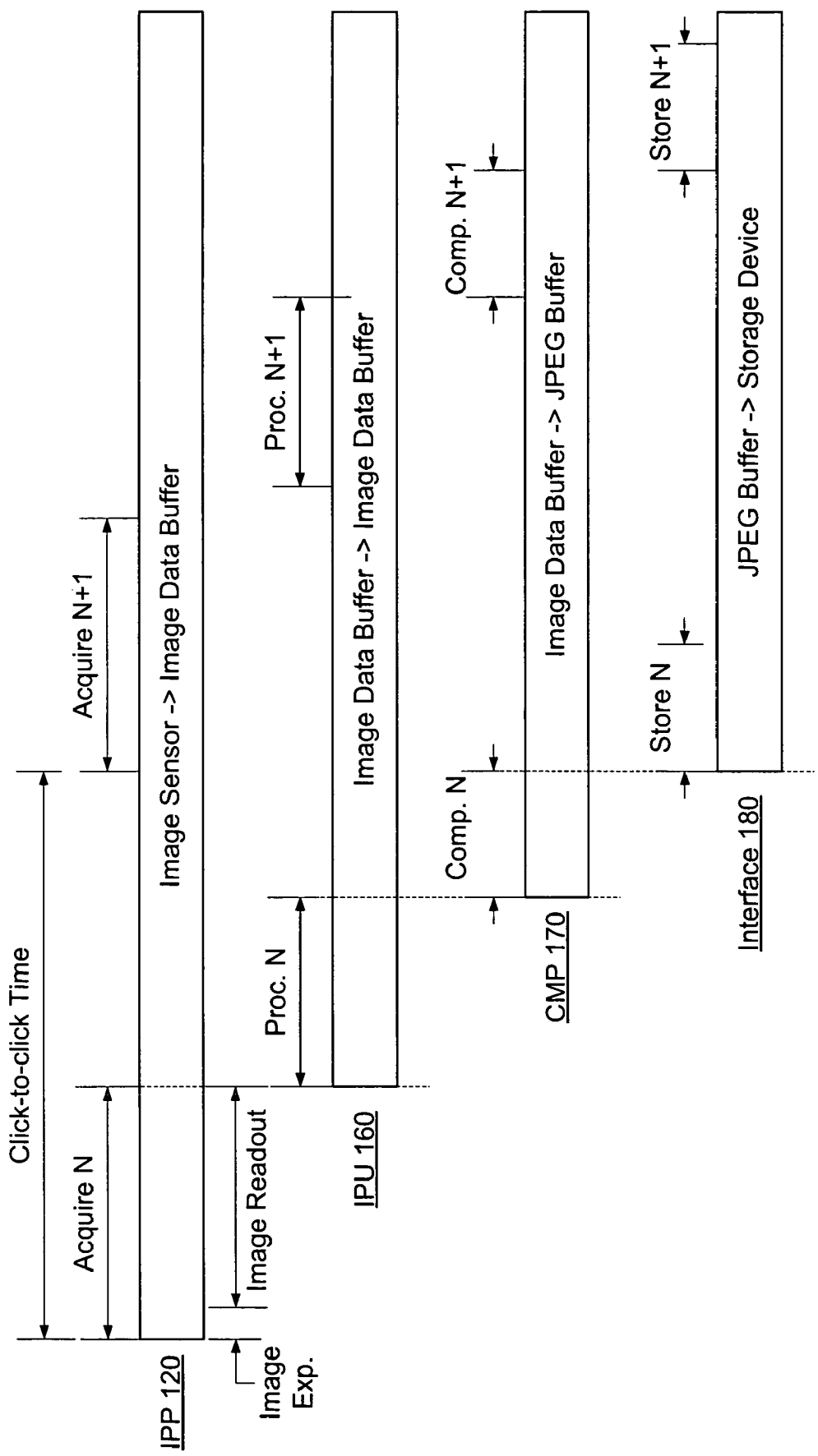
FIG. 1B is a timeline diagram illustrating the operation of the prior art digital camera.

FIG. 1B is a timeline diagram illustrating the operation of the prior art digital camera from a different perspective. IPP 120 acquires a series of raw images from the image sensor 110 and loads them, one by one, into the image data buffer. Note that the two images N and N+1 are not necessarily two consecutive images captured by the image sensor. Rather, images N and N+1 represent two images that will be processed consecutively by IPU 160. The time interval between the beginning times of the image acquisition intervals for acquiring images N and N+1 is defined as the digital camera's click-to-click time. The time interval for the acquisition of an image may be further divided into a time interval for image exposure followed by a time interval for image readout from the image sensor to the image data buffer.

As shown in FIG. 1B, IPU 160 starts processing image N after it is completely loaded into the image data buffer. It converts the raw image from the RGB color domain to the YUV color domain. Since the image data buffer does not have sufficient space to host both the raw image and the processed image simultaneously, the processed image occupies the same space (or at least some of the same space) that used to be occupied by the raw image.

Next, CMP 170 begins to compress the new image N section by section and move each compressed section into the JPEG buffer. At the end of the image compression, there are two copies of image N coexisting in the digital camera, an uncompressed copy in the image data buffer and a compressed copy in the JPEG buffer. Only after the image compression is completed, the user is allowed to press the digital camera's shutter button again to acquire image N+1. In other words, the click-to-click time of the prior art digital camera is approximately the sum of the time interval to acquire image N, the time interval to process image N and the time interval to compress image N.

Figure 1C:
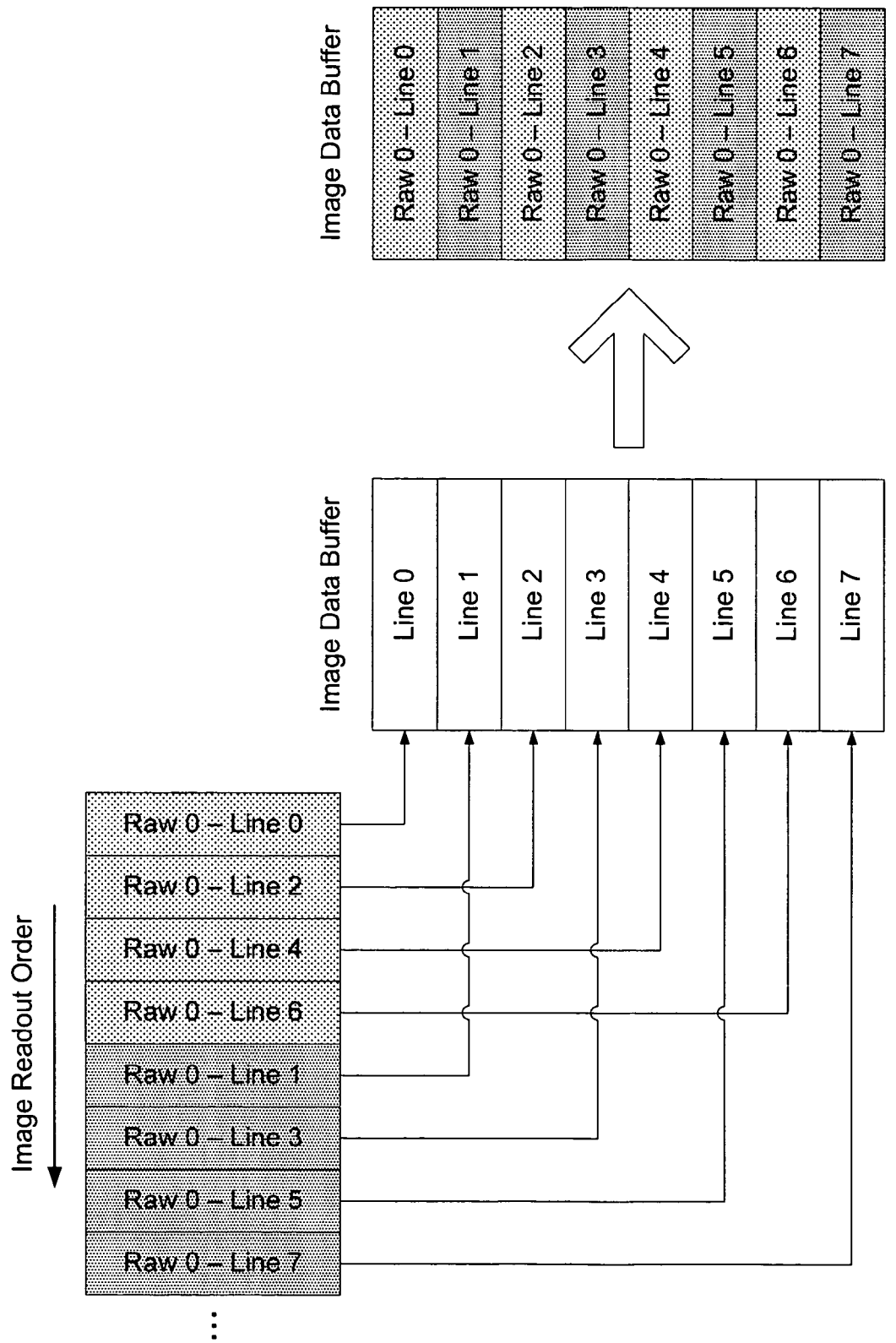
FIG. 1C is a block diagram illustrating the two different orders associated with the capture of an image by the prior art digital camera.

An image captured by the image sensor may include hundreds or even thousands of image lines. For illustrative purposes, the raw image shown in FIG. 1C has only eight image lines, line 0-line 7. The eight image lines are usually grouped into two fields, e.g., the four even lines corresponding to one field and the four odd lines corresponding to the other field. Although there are image sensors that are designed to read out raw image lines in a progressive order, many image sensors available today are designed to read out raw image lines in an interlaced order. In other words, the even image lines 0, 2, 4, and 6 are first read out and loaded into lines 0, 2, 4, and 6 in the image data buffer, and the odd image lines 1, 3, 5, and 7 are then read out and loaded into lines 1, 3, 5, and 7 in the image data buffer, respectively. As a result, the eight image lines of the raw image are stored in the image data buffer in a physically progressive order. A benefit from this arrangement is that it makes it easier for the subsequent image processing and image compression procedures, since many of these procedures need to proceed in a progressive order.

An image sensor is not an ideal storage device. Once a raw image is captured by the image sensor, it must be loaded into the image data buffer within a predefined period of time to avoid losing information. If the digital camera has a multi-image data buffer that can host two or more raw images simultaneously, the operation of processing and converting the raw image to the digital camera output format can be decoupled from the operation of capturing and reading out the raw image from the image sensor. In that event, the subsequently acquired raw image can be stored in the same image data buffer while the previously captured image is still being processed. As mentioned above, this multi-image data buffer may significantly increase the cost of the digital camera. This is why many digital cameras include an image data buffer that can host only a single raw image and therefore exhibit long click-to-click time.

Referring again to FIG. 1C, the limitation of the prior art digital cameras may be attributed to an unnecessary assumption that the image lines of a raw image are best stored in the image data buffer in a physically progressive order. In reality, the image lines are loaded into the image data buffer in a temporally interlaced order while the image lines in the image data buffer are processed in a physically progressive order (i.e., the image lines are physically ordered in the image buffer in the same order that they are to be processed). Therefore, before the allocation of the first odd line (line 1) of image N+1, all the even lines (0, 2, 4, and 6) of image N+1 must have been allocated to their corresponding locations in the image data buffer. However, there is no space in the image buffer for the last even line of image N+1 until the last even line of image N in the image buffer has been processed and converted to the digital camera output format, and can therefore be overwritten. As a result, the user has to wait until all the image lines of image N in the image data buffer are completely processed and compressed before he or she can take the next picture. As will be explained below, if the image processing unit knows where to find the image lines of a raw image in the image data buffer in a progressive order without requiring that they be stored in a physically progressive order, the click-to-click time of a corresponding digital camera can be reduced.

Figure 2A:
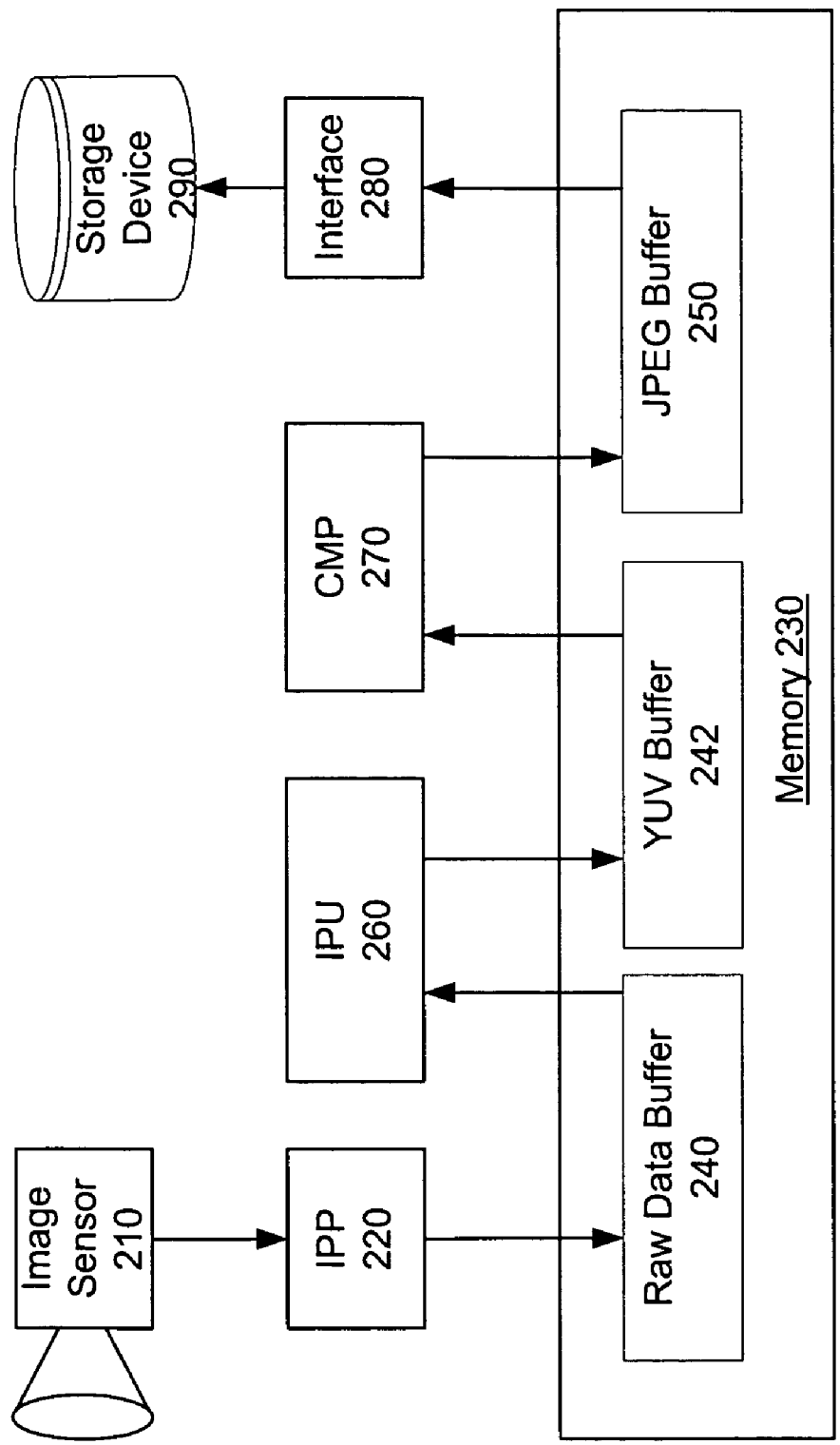
FIG. 2A is a data flow diagram of a digital camera according to a first embodiment of the present invention.

FIGS. 2A-2D illustrate the operation of a digital camera according to a first embodiment of the present invention. In particular, FIG. 2A depicts a data flow diagram of the digital camera. When compared with the data flow in FIG. 1A, a significant distinction is that the image data buffer 140 is divided into two components, a raw data buffer 240 and a YUV buffer 242. IPP 220 reads a raw image out of the image sensor 210 and loads it into the raw data buffer 240, field by field and line by line, in an interlaced order. Unlike FIG. 1A, the raw image lines need not be stored in the raw data buffer in a physically progressive order. Rather, each raw image line is stored at a specific location in the raw data buffer in accordance with a predefined memory allocation algorithm. The same algorithm is also implemented by IPU 260 so that it knows where to find lines of the raw image in the raw data buffer 240 and process them in a logically progressive order (i.e., from the first image line of the image to the last, regardless of the physical storage location of those image lines in the raw data buffer 240).

Furthermore, unlike the prior art digital camera in which the processed image overwrites the raw image, the digital camera according to the first embodiment stores the processed image in the YUV buffer 242. CMP 270 retrieves the processed image from the YUV buffer 242, compresses it into a JPEG-format file, and stores the file in the JPEG buffer 250. Note that the YUV buffer is a dynamic object in the memory 230. Its location and size depend on the total capacity of the memory 230, the size of the raw data buffer 240 (which is a function of the image size of the image sensor), and the size of the JPEG buffer (which is a function of the image compression ratio). For illustrative purposes, the subsequent discussion assumes that the memory 230 is a 32 MB DRAM and the image size of the image sensor is 7M pixels and each pixel corresponds to 2 bytes. So the size of a raw image is about 14 MB.

Figure 2B:
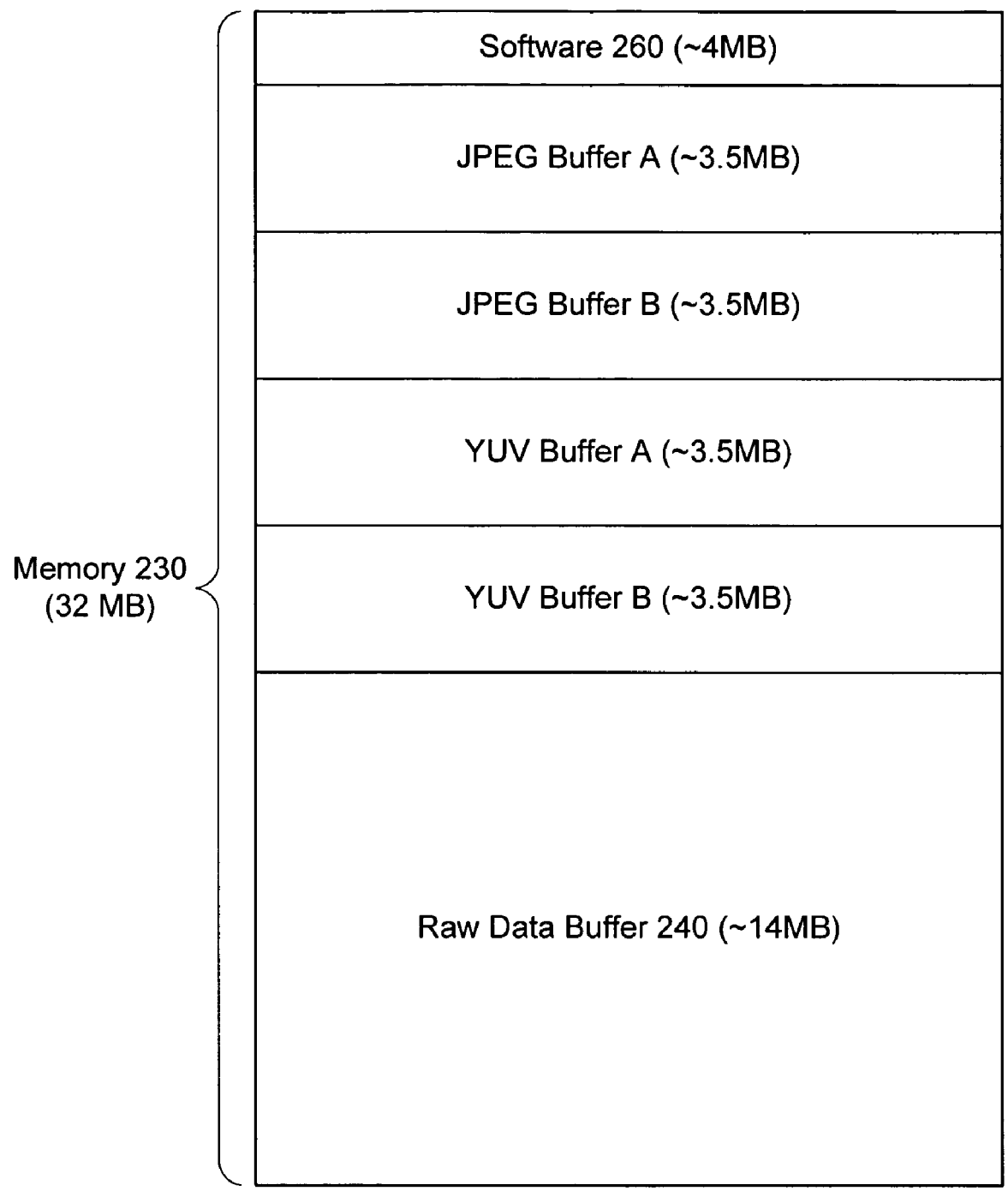
FIG. 2B is a space allocation diagram of memory in the digital camera according to the first embodiment of the present invention.

FIG. 2B is an exemplary space allocation diagram of the 32 MB DRAMS, suitable for use when the image compression ratio is 2:1. In particular, a memory space of about 4 MB is reserved for hosting various types of software 260 including, but not limited to, image processing procedures. The raw data buffer 240 is about 14 MB to host one raw image. Since the image compression ratio is 2:1, the JPEG buffer is about 7 MB. In some embodiments, the 7 MB memory space is partitioned into two halves, A and B, for better performance, each half having approximately 3.5 MB of memory space. The remaining free space in the DRAM is about 7 MB, which is partitioned into two YUV buffers, A and B, each having approximately 3.5 MB of memory space.

Figure 2C:
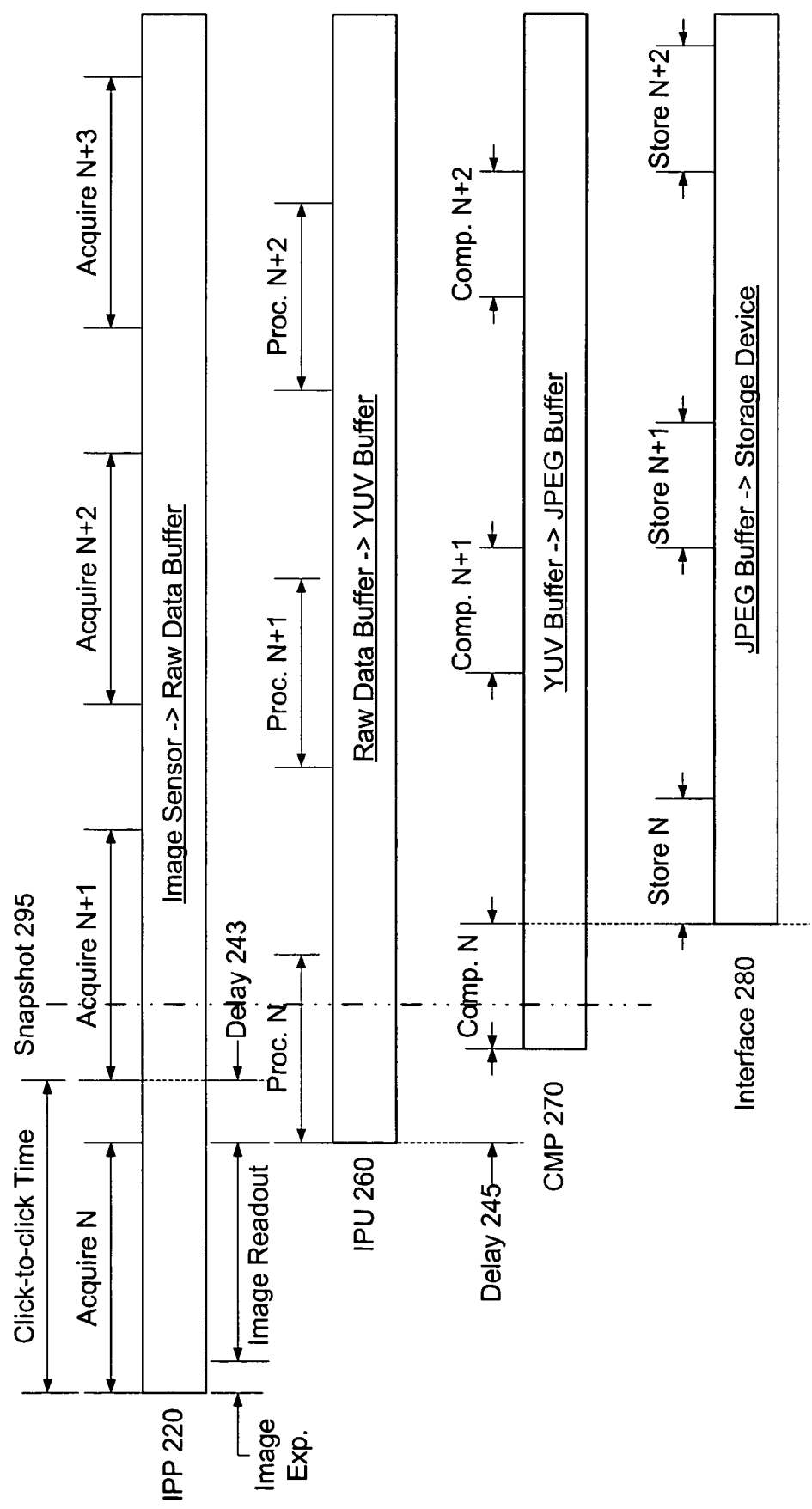
FIG. 2C is a timeline diagram of the digital camera according to the first embodiment of the present invention.

FIG. 2C is a timeline diagram illustrating how different components of the digital camera operate in parallel according to the first embodiment of the present invention. IPU 260 starts processing image N soon after it is completely loaded into the raw data buffer. Similarly, a compressed image is transmitted to the storage device through interface 280 soon after it has been completely loaded into the JPEG buffer. However, there are several significant distinctions between the digital camera shown in FIG. 2C and the prior art digital camera shown in FIG. 1B.

It is worth noting that FIG. 2C depicts that the image sensor does not need to wait until the complete compression of image N by CMP 270 before acquiring image N+1. For that matter, it does not even have to wait for the complete processing of image N by IPU 260. The two time delays 243 and 245 indicate that the image sensor begins acquiring image N+1 shortly after IPU 260 starts processing image N and even before CMP 270 starts compressing image N. Time delay 243 represents the interval between the end of image readout from the image sensor to the beginning of a next image acquisition operation. Time delay 245 represents the portion of the image processing interval between the end of image readout from the image sensor to the beginning of image compression. As a result, the click-to-click time shown in FIG. 2C is significantly shorter than the sum of the time interval to acquire image N, the time interval to process image N and the time interval to compress image N. In some embodiments, the time delay 243 is very short and the click-to-click time is no longer than 105% of the time interval to acquire image N. In other embodiments, the click-to-click time is no longer than 110% of the time interval to acquire image N, and in yet other embodiments the click-to-click time is no longer than 120% of the time interval to acquire image N. Therefore, the digital camera shown in FIG. 2C has better click-to-click performance than the digital camera shown in FIG. 1B.

There are at least two reasons why the acquisition of image N+1 by the image sensor does not have to wait for the complete processing of image N. First, the digital camera according to the first embodiment of the present invention does not require that the image lines of a raw image be stored in the raw data buffer in a physically progressive order. As will be shown below in connection with FIG. 4A, the same image line in different raw images may be stored at different lines (i.e., storage locations) in the raw data buffer. Second, the processed image lines are no longer stored in the raw data buffer, but in the separate YUV buffer. After converting a RGB-format image line in the raw data buffer into a YUV-format image line in the YUV buffer, IPU 260 immediately releases the space occupied by the RGB-format image line for IPP 220 to load the next incoming image line associated with image N+1. Meanwhile, IPU 260 understands the spatial order of the raw image lines in the raw data buffer, and it therefore knows how to retrieve and process them in a logically progressive order. FIG. 2C also suggests that CMP 270 may start compressing image N before IPU 260 finishes processing image N. More specifically, CMP 270 starts compressing the image whenever there are a sufficient number of processed image lines in the YUV buffer.

Figure 2D:
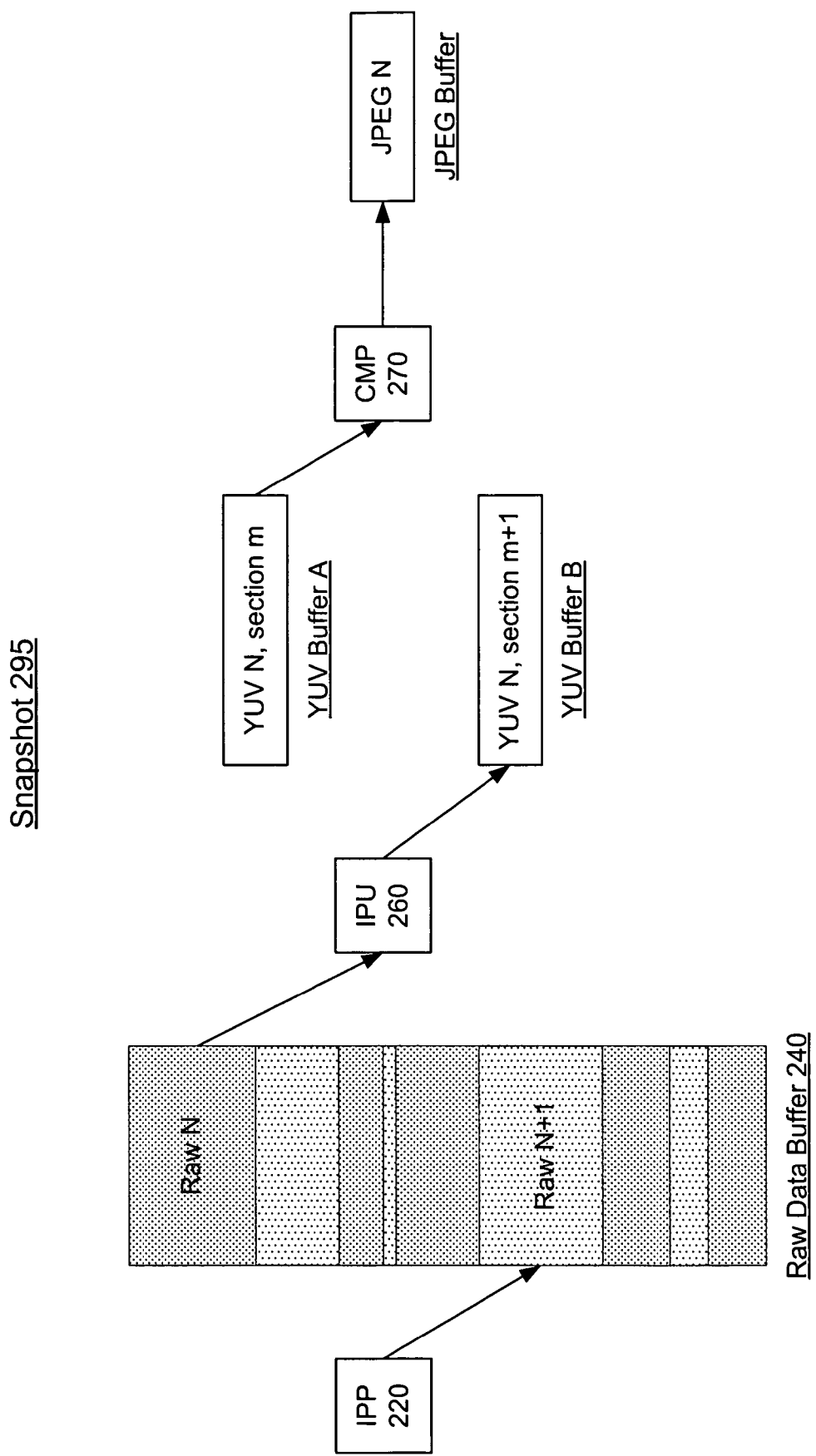
FIG. 2D is a memory usage snapshot diagram of the digital camera according to the first embodiment of the present invention.

FIG. 2D is a conceptual diagram or snapshot 295 of the memory usage in a digital camera according to the first embodiment of the present invention. Note that image lines of raw image N occupy some memory space in the raw data buffer 240 and image lines of raw image N+1 occupy other memory space in the raw data buffer 240. Neither raw image N nor raw image N+1 occupies a continuous region of the raw data buffer 240. Since the capacity of the raw data buffer 240 is not sufficiently large to host two complete images, the image lines in the raw data buffer 240 only constitute a respective portion of the raw images N and N+1. In order to co-exist with raw image N, image lines of raw image N+1 have to overwrite some of the processed image lines of raw image N. Therefore, at any moment during the operation of the digital camera, the maximum amount of image data stored in the raw data buffer 240 is no more than the greater of (A) the amount of image data from the image sensor associated with raw image N, and (B) the amount of image data from the image sensor associated with raw image N+1.

IPP 220 loads interlaced image lines of image N+1 into certain regions of the raw data buffer according to the pre-defined memory allocation algorithm. Simultaneously, IPU 260 retrieves image lines of image N in a logically progressive order from the raw data buffer according to the same algorithm and then transfers the processed image lines of image N into YUV buffer B, and CMP 270 compresses the processed image lines of image N in YUV buffer A and stores the compressed version in the JPEG buffer.

Figure 3A:
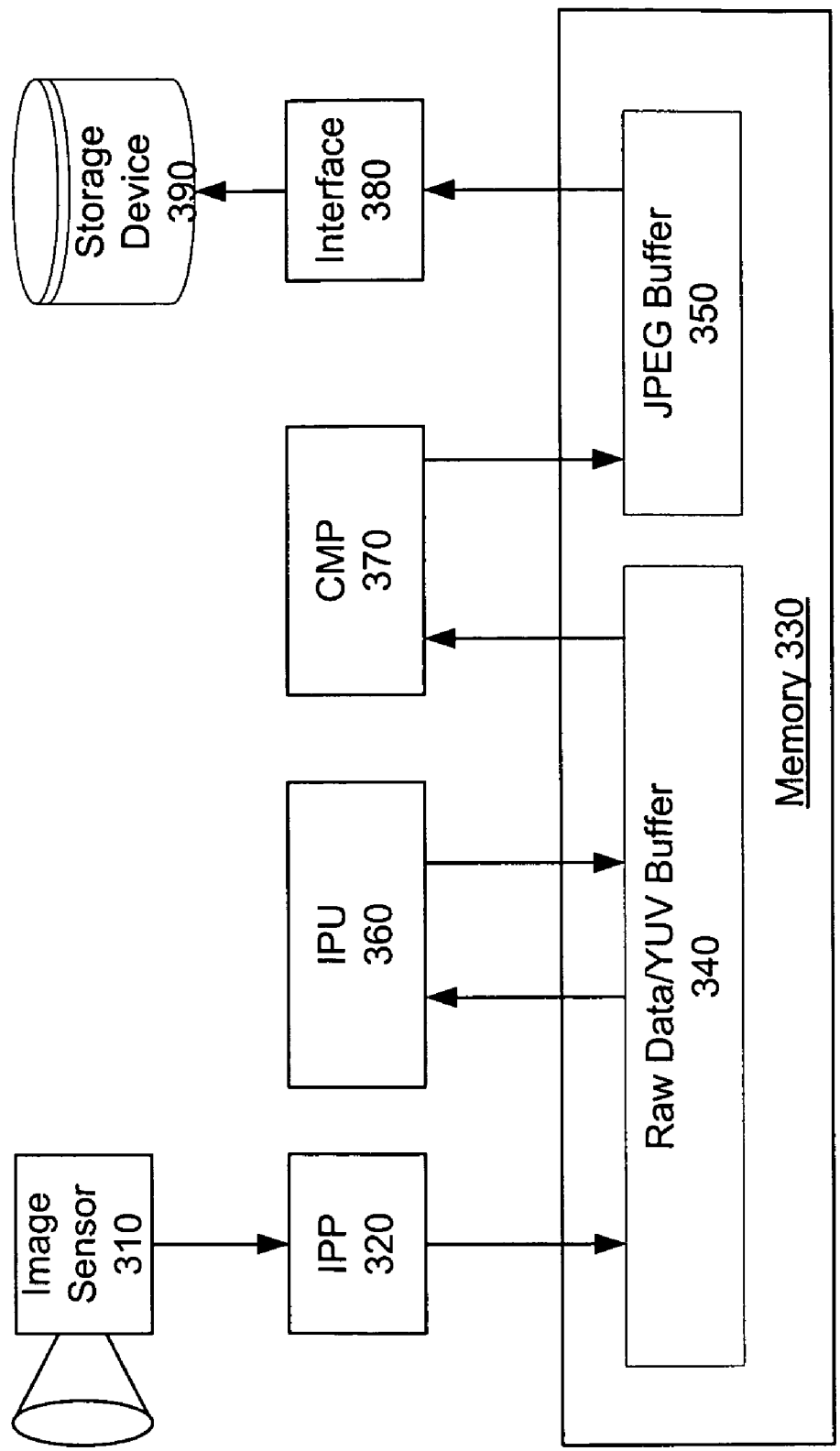
FIG. 3A is a data flow diagram of a digital camera according to a second embodiment of the present invention.
Figure 3B:
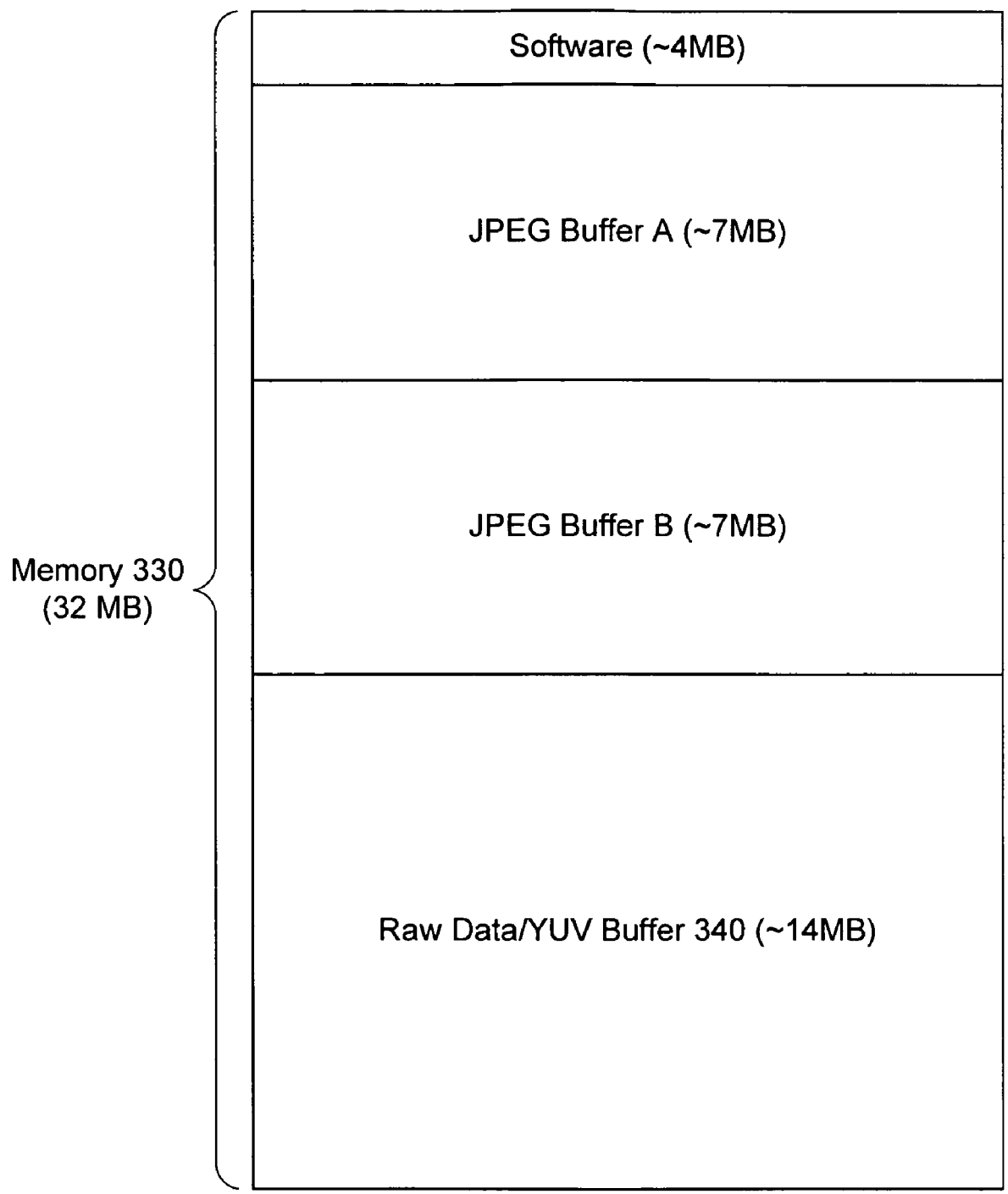
FIG. 3B is a space allocation diagram of memory in the digital camera according to the second embodiment of the present invention.
Figure 3C:
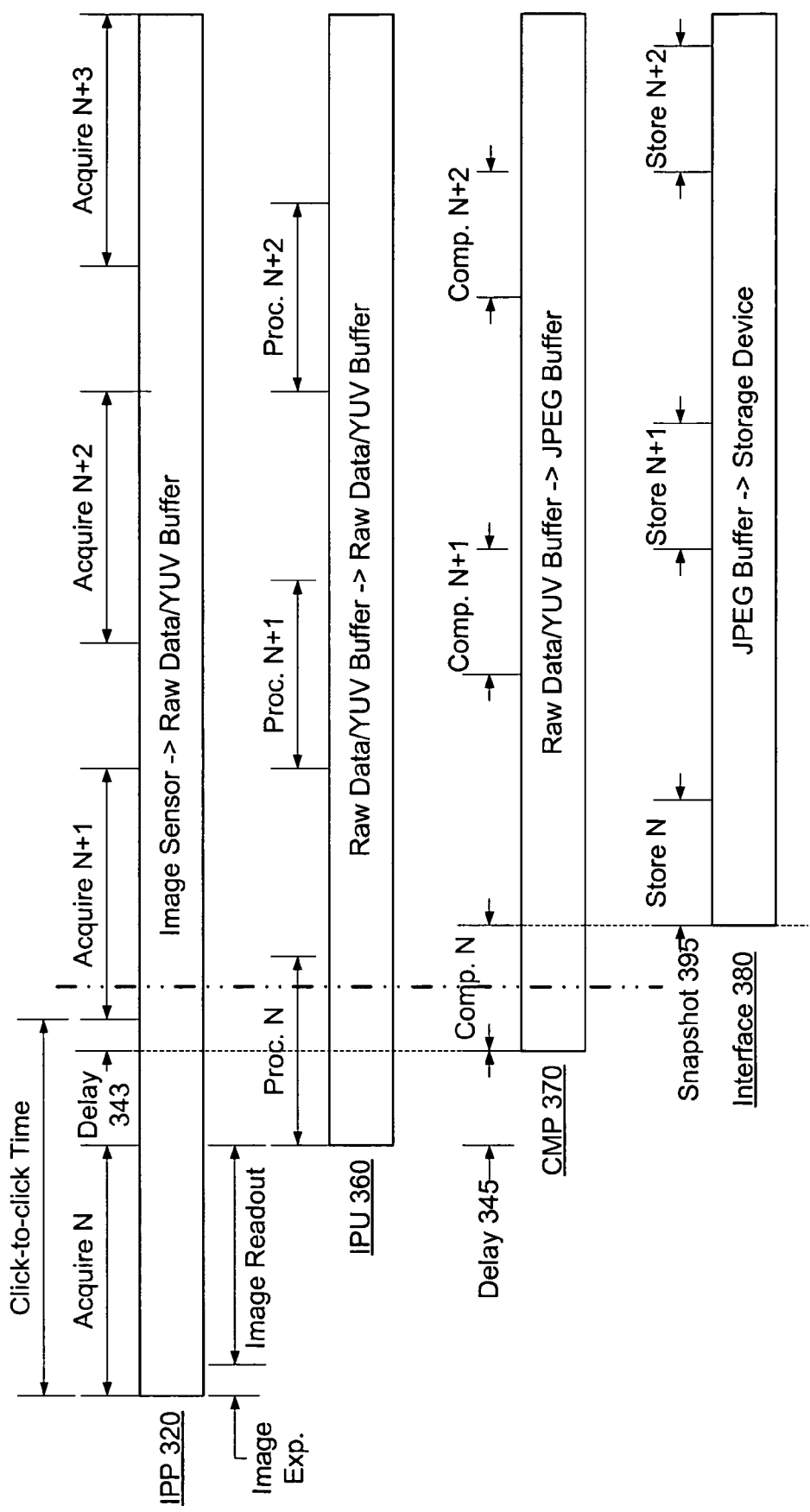
FIG. 3C is a timeline diagram of the digital camera according to the second embodiment of the present invention.

As mentioned above, there are multiple factors affecting the existence of the YUV buffer in the memory and its exact size. If the image size of the image sensor is too large or the image compression ratio is too small, the memory in the digital camera may not have any free space left for the YUV buffer. As mentioned above, the separate YUV buffer is only one of the reasons for the improved performance of the digital camera according to the first embodiment. Even if there is no separate YUV buffer in the memory, it is still possible to reduce a digital camera's click-to-click time. FIGS. 3A-3C illustrate the operation of such a digital camera according to a second embodiment of the present invention.

Assume that the memory 330 is still a 32 MB DRAM, the image size of the image sensor is still 7 M pixels, and therefore 14 MB since each pixel corresponds to 2 bytes. But the image compression ratio is now 1:1. In other words, the processed image is not compressed according to this embodiment in order to achieve the best resolution. Therefore, there is no free space in the memory 330 for a separate YUV buffer. The YUV buffer and the raw data buffer are merged into one buffer 340 in the memory 330 (FIGS. 3A and 3B). As a result, the IPU 360 in this embodiment is configured to overwrite the raw image data with YUV data as the YUV data is generated by the IPU 360.

This configuration is similar to the prior art digital camera shown in FIG. 1A in one respect, i.e., the image sensor has to wait for the processed image to be at least partially moved into the JPEG buffer before acquiring the next image. This is because the processed image lines will be stored at the same location in buffer 340 that the corresponding raw image lines previously occupied. However, as will be demonstrated below in connection with FIGS. 3C and 3D, the image sensor does not have to wait for image N to be completely moved into the JPEG buffer before it acquires the next image. Consequently, the click-to-click time of the digital camera according to the second embodiment of the present invention is also less than the sum of the time interval to acquire image N, the time interval to process image N and the time interval to compress image N.

As shown in FIG. 3C, there is a time delay 345 from the beginning of processing image N and the beginning of compressing image N. This time delay is necessary for IPU 360 to accumulate in buffer 340 a sufficient number of processed image lines to enable the operation of CMP 370. Similarly, there is a time delay 343 between the beginning of compressing image N and the beginning of acquiring image N+1. This time delay is necessary for CMP 370 to compress a sufficient number of image lines and move them into the JPEG buffer before there is sufficient space in buffer 340 for the image sensor to begin loading the next image N+1. The number of image lines that must be compressed prior to beginning the loading of the next image may be determined by the compression methodology being used (e.g., the compression unit CMP 370 may compress a strip of 8, 16 or 32 lines of image data at a time), and this set of image line may be called a strip or block of image lines. In some embodiments, the time delays 343 and 345 are very short and the click-to-click time is no longer than 115% of the time interval to acquire image N.

Figure 3D:
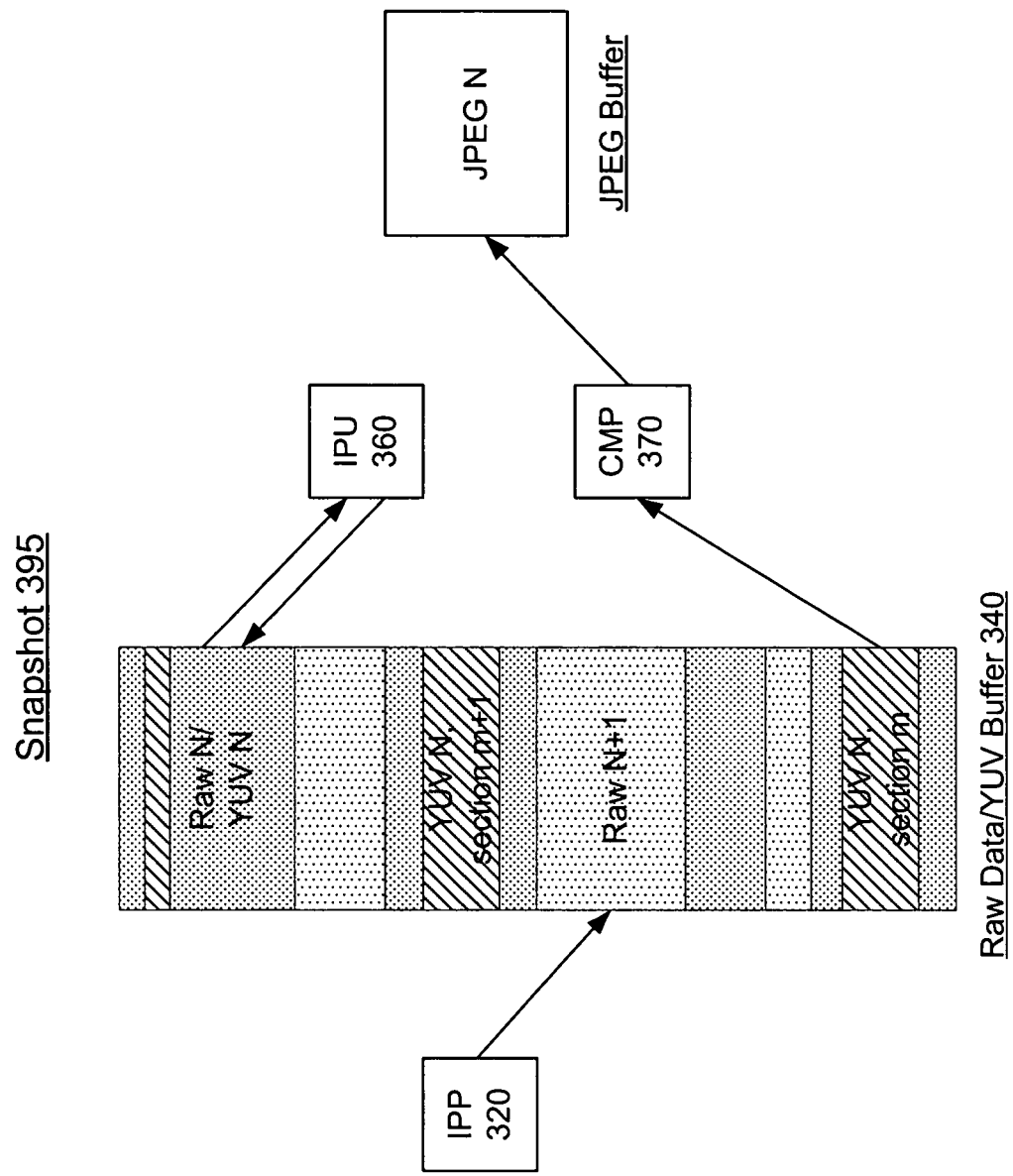
FIG. 3D is a memory usage snapshot diagram of the digital camera according to the second embodiment of the present invention.

The snapshot 395 shown in FIG. 3D provides a more intuitive illustration of the operation of the digital camera according to the second embodiment of the present invention. Note that there are three types of image data in buffer 340: raw image N+1, raw image N, and processed image N (denoted "YUV N" in FIG. 3D). While IPU 360 continuously processes image lines of raw image N and converts them from the RGB color domain to the YUV color domain, CMP 370 transfers previously processed YUV-format image lines of image N from buffer 340 to the JPEG buffer. At the same time, IPP 320 loads into buffer 340 image lines of raw image N+1 to overwrite some of the previously processed image lines of image N that have already been exported from buffer 340. The reason that the three components, IPP 320, IPU 360, and CMP 370, can operate in parallel with each other is that they all abide by a predefined memory allocation algorithm so that they know where to retrieve and/or overwrite next image lines in buffer 340. These different components of the digital camera are paced in a predefined manner to optimize the use of buffer 340.

As mentioned above, IPP 320 reads out a raw image from the image sensor and loads it into a raw data buffer in an interlaced order, and IPU 360 processes the raw image lines and converts them from the RGB color domain to the YUV color domain in a logically progressive order. In order to reduce the digital camera's click-to-click time, both IPP 320 and IPU 360 need to abide by the same predefined memory allocation algorithm so that IPP 320 understands where the next free buffer line is located in the raw data buffer and IPU 360 knows where to retrieve the next raw image line to be processed.

Figure 4A:
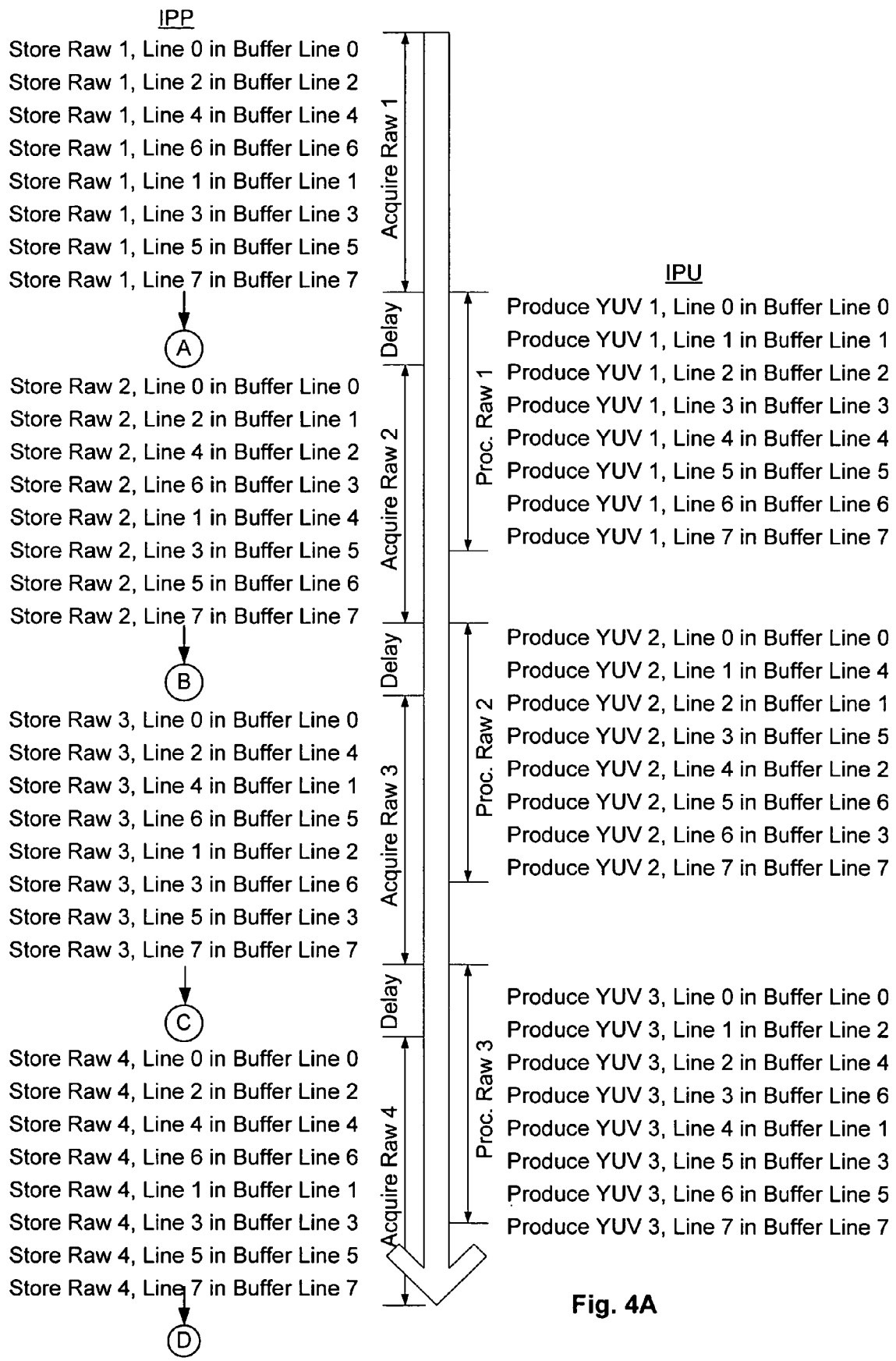
FIGS. 4A and 4B provide an example of a predefined memory allocation algorithm enabling the parallel operation of different components in a digital camera according to some embodiments of the present invention.
Figure 4B:
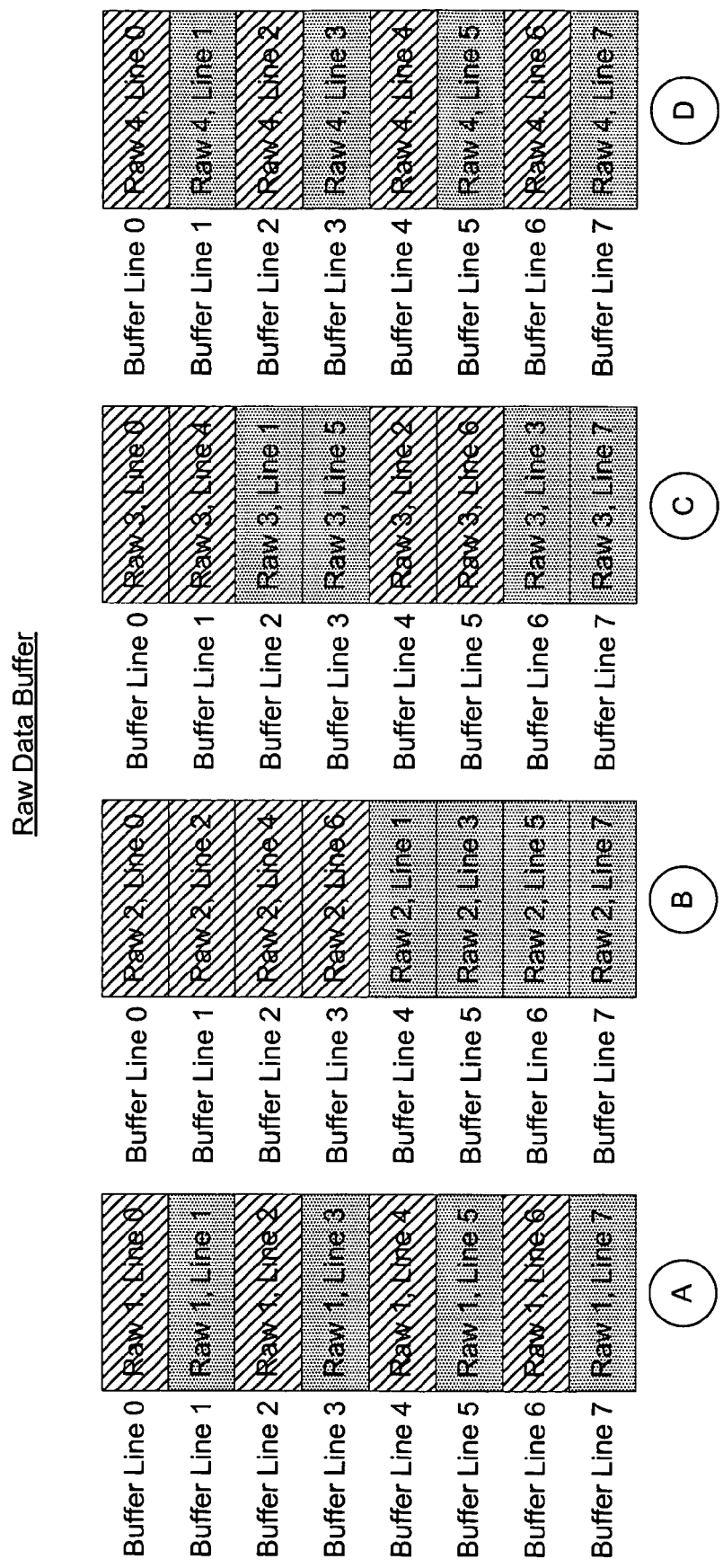

FIGS. 4A and 4B, in combination, illustrate an exemplary memory allocation algorithm enabling the parallel operation of the image pre-processing unit and the image processing unit according to some embodiments of the present invention. In this particular case, it is assumed that there is a separate YUV buffer and raw data buffer in the digital camera. It is further assumed that each raw image captured by the image sensor has only eight image lines for illustrative purposes, and the eight image lines are divided into two fields, the even field (including lines 0, 2, 4, and 6) and the odd field (including lines 1, 3, 5, and 7).

According to this algorithm, provided that one specific buffer line in the raw data buffer currently hosts image line $L_N$ of raw image N, the image line $L_{N-1}$ of raw image N−1 previously hosted by the same buffer line in the raw data buffer is defined as:

$$L_{N-1} = (L_N \% \text{Field\_Num}) * \text{Field\_Size} + L_N / \text{Field\_Num},$$

wherein

Field_Num corresponds to the number of fields the raw image has;

Field_Size corresponds to the number of lines each field has;

% represents the modulo function; and the division operation is an integer division operation in which any factional portion of the quotient is discarded, for example 7/2=3.

In the example shown in FIGS. 4A and 4B, parameter Field_Num equals to two (2) and parameter Field_Size equals to four (4). Therefore, the aforementioned formula is reduced to:

$$L_{N-1} = (L_N \% 2) * 4 + L_N / 2.$$

Based on this formula, it is straightforward for IPP to determine where to store a new raw image just arriving at the raw data buffer in a temporally interlaced order and for IPU to determine how to process an existing raw image in the raw data buffer in a logically progressive order. For convenience, Table 1 below lists the physical orders of four consecutively captured raw images in the raw data buffer according to the formula. Note that the physical order of raw image N+3 is the same as that of raw image N. This implies that the physical orders of the raw images vary periodically and the period of this particular example is three (3). In addition, it may be noted that image line 2 occupies the same buffer line slot as image line 1 in the preceding image, image line 4 occupies the same buffer line slot as image line 2 in the preceding image, and so on. This pattern may be described as the temporal sequence of image lines in current image being stored in buffer lines in accordance with the logical order of image lines in the prior image. From another perspective, each image in a sequence of three consecutive images has a different image line to memory location mapping than the other images in the sequence. Furthermore, in digital cameras using image sensors having three or more fields that are separately read out from the image sensor to the raw data buffer, where F represents the number of fields, the number of distinct image line to memory location mappings for a sequence of consecutive images is F+1.

TABLE 1

Physical orders of four consecutively captured raw images

|  | Raw Image N | Raw Image N + 1 | Raw Image N + 2 | Raw Image N + 3 |
| --- | --- | --- | --- | --- |
| Buffer Line 0 | Image Line 0 | Image Line 0 | Image Line 0 | Image Line 0 |
| Buffer Line 1 | Image Line 1 | Image Line 2 | Image Line 4 | Image Line 1 |
| Buffer Line 2 | Image Line 2 | Image Line 4 | Image Line 1 | Image Line 2 |
| Buffer Line 3 | Image Line 3 | Image Line 6 | Image Line 5 | Image Line 3 |
| Buffer Line 4 | Image Line 4 | Image Line 1 | Image Line 2 | Image Line 4 |
| Buffer Line 5 | Image Line 5 | Image Line 3 | Image Line 6 | Image Line 5 |
| Buffer Line 6 | Image Line 6 | Image Line 5 | Image Line 3 | Image Line 6 |
| Buffer Line 7 | Image Line 7 | Image Line 7 | Image Line 7 | Image Line 7 |

FIG. 4A further illustrates how IPP 220 and IPU 260 (FIG. 2A) interact with the raw data buffer concurrently. For example, IPP 220 first loads eight interlaced image lines of raw image 1 into the raw data buffer. The physical order of the eight lines in the raw data buffer is shown by block diagram A in FIG. 4B. Next, IPU 260 begins processing the eight image lines in the raw data buffer in a progressive order. After IPU 260 processes a certain number of image lines (e.g., two) and transfers them into a separate YUV buffer, IPP 220 starts loading raw image 2 into the raw data buffer. At this moment, only buffer lines 0 and 1 in the raw data buffer are ready for accept new image lines. As a result, the first two image lines 0 and 2 are stored in the buffer lines 0 and 1 of the raw data buffer, respectively.

After IPU 260 finishes processing the last image line 7 of raw image 1, IPP 260 continues loading the rest of the eight image lines of raw image 2 into the raw data buffer. The complete physical order of the eight lines of raw image 2 in the raw data buffer is shown by block B in FIG. 4B. Note that the two consecutively acquired images have different physical orders in the raw data buffer, even though they both arrive at the raw data buffer in a temporally interlaced order and exit from the buffer in a logically progressive order.

It will be apparent to one skilled in the relevant art that the aforementioned memory allocation algorithm is simplified for illustrative purposes. A real-life image captured by an image sensor may have several hundred or even several thousand image lines and each image may include many more than two fields. However, the principle of the present invention, i.e., optimizing the utilization of the memory space, as illustrated above in connection with FIGS. 4A and 4B, is still applicable without any substantial adjustment.

A feature shared by the aforementioned embodiments is that the memory in the digital camera is partitioned into several regions, each region reserved for a particular mission. In the first embodiment, a first region is the raw data buffer solely responsible for storing raw image data, a second region is the YUV buffer solely responsible for hosting processed image data, and a third region is the JPEG buffer solely responsible for caching compressed image data. A disadvantage associated with this partition scheme is that memory space within one region cannot be used for a different mission, even if it is currently not being used for its intended mission. To a certain degree, this problem is similar to the problem associated with the prior art digital camera. Therefore, a solution to this problem may further improve a digital camera's performance.

Figure 5:
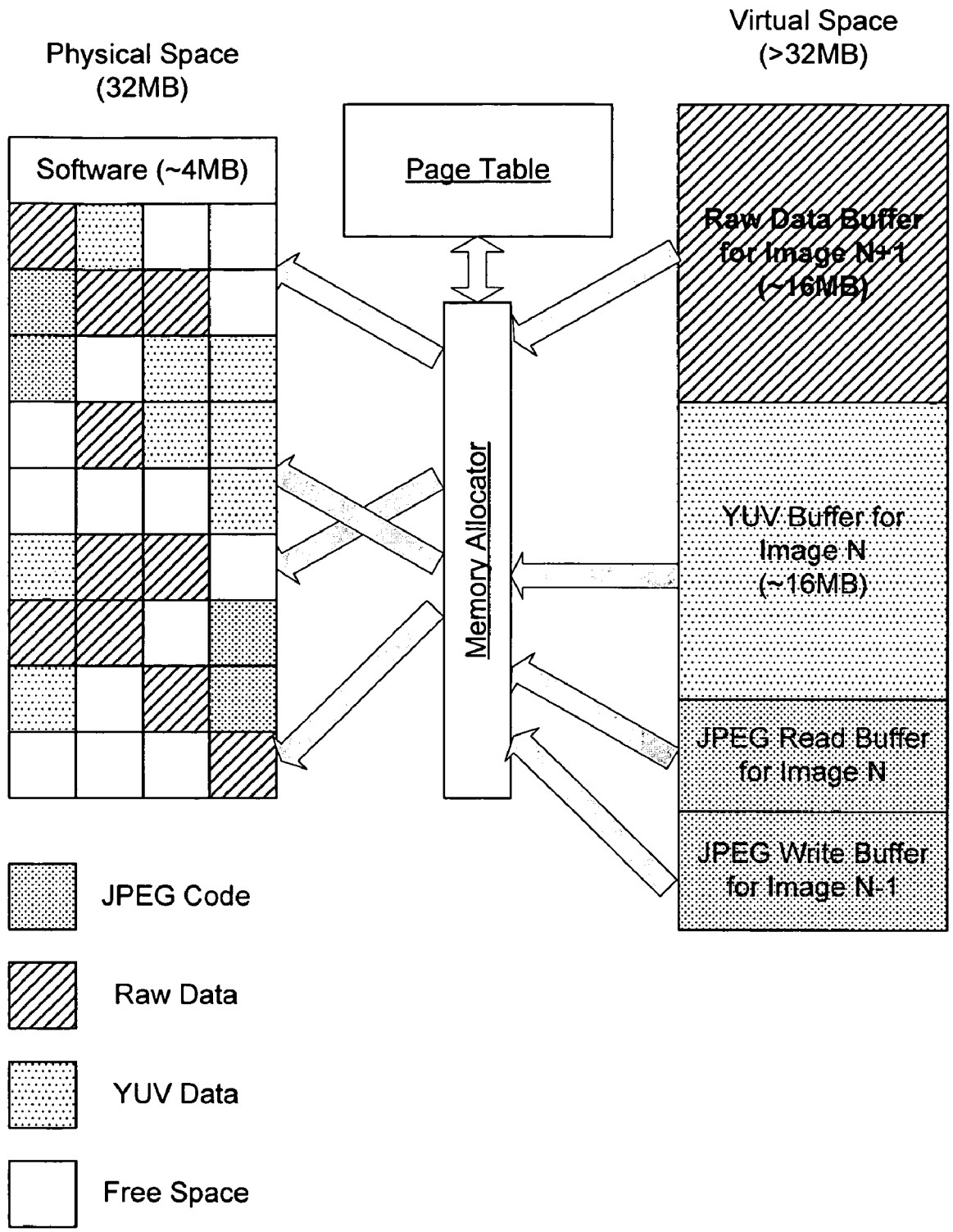
FIG. 5 is a block diagram illustrating an alternative embodiment of the present invention.

FIG. 5 illustrates such an alternative embodiment of the present invention. According to this embodiment, memory (e.g., a 32 MB DRAM) in the digital camera is treated as a physical memory space. A fixed region in the physical memory space (about 4 MB) is reserved for storing software. The remainder of the physical memory space is divided into many small memory pages. The choice of the page size is essentially a tradeoff between two competing interests. On the one hand, the smaller the page size, the higher the efficiency of memory utilization. On the other hand, the smaller the page size, the more memory pages that need to be managed and the higher the overhead of system management. In some embodiments, the page size is 8 KB. Each memory page does not have a fixed responsibility. It may be used for storing a portion of a raw image at one moment, and for storing a portion of a compressed JPEG file at another moment.

In addition to the static physical memory space, there is a large dynamic virtual memory space. The virtual memory space is usually larger than the physical space. For example, the virtual space includes at least a raw data buffer (about 16 MB), a YUV buffer (about 16 MB), a JPEG read buffer and a JPEG write buffer, etc. There is a page table or a bitmap or the like for linking or mapping each location in the virtual space to a particular memory page in the physical memory space. Note that the links between the two spaces are dynamic. During operation of the digital camera, different locations in the virtual space may occupy the same memory page in the physical space at different moments. The digital camera's one or more processors perform their operations using virtual memory addresses, which are then translated by the page table into physical addresses for accessing the data to be used by the processors. When a processor attempts to utilize a virtual memory address that is not currently mapped to a physical memory location, thereby causing a memory fault, a memory allocator identifies an available physical page of memory, allocates it to the virtual memory page associated with the virtual memory address that caused the memory fault and updates the page table accordingly. The operation of the processor then resumes.

According to this embodiment, components of the digital camera such as IPP 202, IPU 206, and CMP 270, etc., interact with the buffers in the virtual memory space, not with the physical memory space. Each buffer is then mapped to a unique set of memory pages in the physical memory space. More specifically, entries of the page table currently in use may be stored within a processor of the digital camera in a page table cache, sometimes called the translation look-aside buffer (TLB). The page table entries in the TLB map virtual memory pages to physical pages (sometimes called physical page frames) in the physical memory space. As a result of the dynamic allocations of virtual memory pages to physical memory pages, the memory pages associated with two image buffers may be distributed in the physical memory space in a mixed fashion, even though the two image buffers each occupy completely separate regions of the virtual memory space.

Unlike the aforementioned embodiments in which an individual component, e.g., IPP 220 or IPU 260, needs to know the physical order of an image in the raw data buffer, only the memory allocator needs to know the physical order. For example, whenever a component finishes an operation and releases a portion of a particular buffer in the virtual space, the memory allocator updates the page table accordingly to allow other components to claim the newly released memory pages in the physical memory space. Similarly, whenever a component requires a certain amount of free space, the memory allocator scans the page table and reserves a predetermined number of free memory pages in the physical space. Occasionally, if the memory allocator does not find sufficient free space for a particular operation, the operation will be suspended until the required amount of memory space is available. According to this embodiment, each component in the digital camera operates in an optimal mode. Overall, the digital camera can achieve better performance than prior art digital cameras.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

What is claimed is:

1. A method of processing a sequence of images in a digital camera, comprising:
    processing a first image in the sequence of images, the first image being loaded into a unified memory space of the digital camera in a first order and being processed in a second order; and
    overwriting at least a portion of the first image in the unified memory space with image data of a second image in the sequence of images before the processing of the first image is completed;
    wherein the image lines of the first image are distributed in the unified memory space differently from the image lines of the second image in accordance with a predefined memory allocation algorithm.

2. The method of claim 1, wherein each of the first and second images includes multiple image lines, and each image is loaded into the unified memory space in a temporally interlaced order and processed in a logically progressive order.

3. The method of claim 1, further comprising:
    processing a predetermined number of image lines of the first image in a logically progressive order;
    loading image lines of the second image into the unified memory space in a temporally interlaced order to overwrite the processed image lines of the first image; and
    repeating said processing and loading steps until the second image is completely processed.

4. The method of claim 3, wherein the unified memory space includes at least first and second memory buffers, and image lines of an image are first loaded into the first memory buffer for processing and processed image lines of the image are then stored in the second memory buffer.

5. The method of claim 1, wherein the unified memory space includes one or more memory devices.

6. The method of claim 1, wherein the first and second images are captured consecutively by the digital camera.

7. A method of processing a sequence of images in a digital camera, the digital camera having an image sensor, the method comprising:
    acquiring a first image and a second image with the image sensor, wherein the first and second images are captured consecutively by the image sensor;
    storing image data of the first image and image data of the second image in a unified memory space within the digital camera, including beginning to store the image data of the second image in the unified memory space prior to completing processing of the first image and at least partially overwriting the image data of the first image in the unified memory space with the image data of the second image; and
    processing each image by performing at least a predefined operation on the image data of the image;
    wherein the image lines in the unified memory space are arranged in accordance with a predefined memory allocation algorithm, and the image lines of the first image are distributed in the unified memory space differently from the image lines of the second image in accordance with a predefined memory allocation algorithm.

8. The method of claim 7, wherein the predefined operation has been performed on the image data of the first image before it is overwritten by the second image.

9. The method of claim 7, wherein the image data of each image is stored in the unified memory space in a non-sequential order associated with a utilization scheme for the unified memory space and the image data of each image is exported from the unified memory space in a different order when performing the predefined operation.

10. The method of claim 9, wherein the utilization scheme includes:
    storing image lines of an image in the unified memory space in a temporally interlaced order; and
    processing the image lines of the image in a logically progressive order;
    wherein the image lines in the unified memory space are arranged in accordance with a predefined memory allocation algorithm.

11. The method of claim 7, wherein the unified memory space includes at least first and second memory buffers, and image lines of an image are first loaded into the first memory buffer for processing and processed image lines of the image are then stored in the second memory buffer.

12. A method of processing a sequence of images in a digital camera, the digital camera having an image sensor, the method comprising:
  acquiring a first image with the image sensor;
  reading image data of the first image to memory within the digital camera;
  performing a first processing operation on the image data of the first image to produce processed image data stored in the memory;
  acquiring a second image with the image sensor; and
  performing a second processing operation on the processed image data of the first image stored in the memory;
  wherein an acquisition time interval between the acquisition of the first and second images is less than a sum of an image readout time interval to read the image data of an image from the image sensor to the memory and first and second processing time intervals to perform the first and second processing operations on the image data of the image, and a maximum amount of image data from the image sensor that is stored in the memory is less than a total amount of image data from the image sensor associated with the first and second images;
  wherein the time interval between the acquisition of the first and second images is less than 115 percent of the sum of an image exposure time interval plus the image readout time interval.

13. The method of claim 12, wherein the first and second images are consecutive images of a sequence of images acquired with the image sensor.

14. The method of claim 12, wherein the maximum amount of image data from the image sensor that is stored in the memory is no more than the greater of (A) the amount of image data from the image sensor associated with the first image, and (B) the amount of image data from the image sensor associated with the second image.

15. The method of claim 12, further comprising:
  overwriting a portion of the image data of the first image in the memory with image data of the second image before the second processing operation on processed image data of the first image is completed.

16. The method of claim 15, wherein the digital camera output format is the JPEG format.

17. The method of claim 12, wherein the first processing operation includes transferring the image data from a RGB color domain to a YUV color domain and the second processing operation includes compressing the image data in the YUV color domain into a file in accordance with a predefined image compression scheme.

18. A method of processing a sequence of images, comprising:
  storing in memory in a digital camera image data of a first image, lines of the first image being stored in the memory buffer in accordance with a first image line to memory location mapping;
  processing the image data of the first image from the memory to produce processed image data; and
  during a time period overlapping the processing of the image data of the first image, storing in memory image data of a second image by overwriting the image data of the first image in the buffer with the image data of the second image, lines of the second image being stored in the memory buffer in accordance with a second image line to memory location mapping that is different from the first image line to memory location mapping.

19. The method of claim 18, wherein the image lines of the first and second images are distributed in the memory space in a mixed fashion.

20. The method of claim 18, wherein a maximum amount of image data stored in the memory is less than a total amount of image data associated with the first and second images.

21. The method of claim 18, wherein a time interval between storing the first and second images in the memory is less than the sum of a readout time interval to read image data of an image from an image sensor to the memory and a processing time interval to process the image data of the image from the memory to produce processed image data.

22. A digital image processor, comprising:
  one or more memory devices hosting a unified memory space;
  an image pre-processing unit for loading image data of a first image into the unified memory space in a first order; and
  an image processing unit for processing image data of the first image in the unified memory space in a second order;
  wherein, the image pre-processing unit is configured to load image data of a second image into the unified memory space and to overwrite at least a portion of the first image in the unified memory space with the image data of the second image before the image processing unit completes processing of the image data of the first image;
  wherein the image pre-processing unit is configured to load lines of the first image in the unified memory space in accordance with a first image line to memory location mapping, and to load lines of the second image in the unified memory space in accordance with a second image line to memory location mapping that is different from the first image line to memory location mapping.

23. The digital image processor of claim 22, wherein, at any moment during the operation of the digital image processor, a maximum amount of image data stored in the unified memory space is less than a total amount of image data associated with the first and second images.

24. The digital image processor of claim 22,
  wherein the unified memory space includes at least first and second memory buffers, and image lines of a raw image are loaded into the first memory buffer for processing and processed image lines of the raw image are stored in the second memory buffer.

25. A digital image processor, comprising:
  one or more memory devices hosting a unified memory space;
  an image pre-processing unit for loading image data of a first image into the unified memory space in a first order; and
  an image processing unit for processing image data of the first image in the unified memory space in a second order;
  wherein, the image pre-processing unit is configured to load image data of a second image into the unified memory space and to overwrite at least a portion of the first image in the unified memory space with the image data of the second image before the image processing unit completes processing of the image data of the first image;
  wherein image lines of the first image are distributed in the unified memory space differently from image lines of the second image in accordance with a predefined memory allocation algorithm.

26. A digital camera, comprising:
  an image sensor for capturing raw images;
  a non-volatile storage device for storing processed images in a digital camera output format; and a digital image processor for processing and converting the raw images to the processed images in the digital camera output format;

the image processor further comprising:

one or more memory devices hosting a unified memory space;

an image pre-processing unit for loading image data of a first raw image into the unified memory space in a first order; and an image processing unit for processing image data of the first image in the unified memory space in a second order;

wherein, the image pre-processing unit is configured to load image data of a second image into the unified memory space and to overwrite at least a portion of the first image in the unified memory space with the image data of the second image before the image processing unit completes processing of the image data of the first image; and wherein image lines of the first raw image are distributed in the unified memory space differently from image lines of the second raw image in accordance with a predefined memory allocation algorithm.

27. The digital camera of claim 26, wherein, at any moment during the operation of the digital image processor, a maximum amount of image data stored in the unified memory space is less than a total amount of image data associated with the first and second images.

28. A digital camera, comprising:

an image sensor for capturing raw images;

a non-volatile storage device for storing processed images in a digital camera output format; and a digital image processor for processing and converting the raw images to the processed images in the digital camera output format;

the image processor further comprising:

one or more memory devices hosting a unified memory space;

an image pre-processing unit for loading image data of a first raw image into the unified memory space in a first order; and an image processing unit for processing image data of the first image in the unified memory space in a second order;

wherein, the image pre-processing unit is configured to load image data of a second image into the unified memory space and to overwrite at least a portion of the first image in the unified memory space with the image data of the second image before the image processing unit completes processing of the image data of the first image;

wherein the image pre-processing unit is configured to load lines of the first image in the unified memory space in accordance with a first image line to memory location mapping, and to load lines of the second image in the unified memory space in accordance with a second image line to memory location mapping that is different from the first image line to memory location mapping.

* * * * *